(12) United States Patent
Roth et al.

(10) Patent No.: US 6,229,501 B1
(45) Date of Patent: May 8, 2001

(54) REFLECTOR AND REFLECTOR ELEMENT FOR ANTENNAS FOR USE IN OUTER SPACE AND A METHOD FOR DEPLOYING THE REFLECTORS

(75) Inventors: Martin Roth, Taufkirchen; Franz Sperber, Kolbermoor, both of (DE)

(73) Assignee: Astrium GmbH, Munich (DE)

( * ) Notice: Subject to any disclaimer, the term of this patent is extended or adjusted under 35 U.S.C. 154(b) by 0 days.

(21) Appl. No.: 09/298,661

(22) Filed: Apr. 23, 1999

(30) Foreign Application Priority Data

Apr. 23, 1998 (DE) .............................................. 198 18 240

(51) Int. Cl.⁷ .................................................. H01Q 15/20
(52) U.S. Cl. ............................................. 343/915; 343/912
(58) Field of Search ..................................... 343/912, 915, 343/916, DIG. 2, 836, 837, 781 P, 781 R (56) References Cited

U.S. PATENT DOCUMENTS

| | | | |
|---|---|---|---|
| 4,343,005 | * 8/1982 | Han et al. ..................... | 343/DIG. 2 |
| 4,562,441 | * 12/1985 | Beretta et al. ................ | 343/DIG. 2 |
| 4,769,647 | * 9/1988 | Herbig et al. ................. | 343/915 |
| 5,198,832 | * 3/1993 | Higgins et al. ................ | 343/915 |
| 5,966,104 | * 10/1999 | Massey et al. ................ | 343/915 |
| 6,047,928 | * 4/2000 | Benilied et al. .............. | 343/DIG. 2 |

* cited by examiner

*Primary Examiner*—Hoanganh Le
*Assistant Examiner*—Trinh Vo Dinh
(74) *Attorney, Agent, or Firm*—Ladas & Parry (57) ABSTRACT

An antenna reflector for satellites or space vehicles having a number of hexagonal individual reflectors (1) which can be arranged around a rigid central element (2). The reflectors (1) are connected to the central element (2) by a support structure (3) that can collapse to hold the reflectors in a compact storage state or be extended to deploy the reflectors. The reflectors (1) are folded like an umbrella in a transport state when the reflectors are collapsed and at the place of use, they are brought into their operating positions and spread out, so that they collectively form a reflector surface. Each reflector (1) has a foldable surface structure connected by a multiple number of ribs (11) to a rigid, central structure (12).

18 Claims, 8 Drawing Sheets

REFLECTOR AND REFLECTOR ELEMENT FOR ANTENNAS FOR USE IN OUTER SPACE AND A METHOD FOR DEPLOYING THE REFLECTORS

FIELD OF THE INVENTION

The present invention relates to a reflector and a reflector element for antennas for use in outer space.

BACKGROUND

Antenna reflectors for satellites or space vehicles must fulfill a number of requirements. For example, they must be lightweight and have a high accuracy. It is important that they can be stowed in a very small space when transported into space.

For this purpose, reflectors have been developed, which are folded together during transport into orbit and are then deployed in space. Conventional mechanisms, however, are often susceptible to jamming together, which often leads to failure of the reflector to be utilized after it is transported into space. In addition, known reflectors only have a limited size, which is additionally limited, for example, by requirements for accuracy. Further, there is the problem that the reflectors are subjected to high stresses due to thermal effects and by radiation, which in the case of known reflectors often leads to a delay and to a consequent inaccuracy of the reflector surface. Specific requirements are placed on the reflector, depending on the type of application, and thus, the development and manufacture of individual reflectors is associated with high cost.

SUMMARY OF THE INVENTION

An object of the present invention is to provide a reflector for use in space, which can be easily transported into space, can be safely and simply deployed, has a large surface with a high shape stability and can be used for multiple purposes.

According to one aspect of the invention, a reflector is provided for antennas for application in space, which comprises:
  a plurality of individual reflector elements,
  a rigid central element,
  a support structure connecting said individual reflector elements to said central element, said support structure having collapsed and extended states which provide respective collapsed and deployed states for said reflector elements,
  said reflector elements in said deployed state adjoining one another to collectively form said reflector.

In this way, it is achieved that the reflector can be stowed in a very small space, and after deployment has a large reflector surface, which is stable and has a high contour accuracy. The reflector returns to its original unfolded state when deployed in the operating state, i.e., without application of external force whereas conventional deployable reflectors are stressed to reach their operating position.

Preferably, the central element is itself a reflector, which forms a part of the overall reflector surface in the operating position. The individual reflectors are preferably hexagonal at their perimetral edges and arranged circumferentially around the central element in the operating position. In this way, a particularly large effective reflector surface is obtained in the operating position.

Preferably, the support structure has rigid support arms, on which flexible elastic elements, such as springs or leaf-spring elements, are arranged to form pivotal connections. In this way a freedom of play of the mechanical elements is achieved, which increases the stability and the surface accuracy of the reflector. The reflector preferably has a securing mechanism such as a clamping device for attaching the individual reflectors in the folded position at one or both sides of the central element. In this way, space is saved, and a self-actuating deployment of the reflector can be obtained without external actuators by virtue of a pre-stress in the pivotal connections when the reflectors are folded.

The number of individual reflectors is variable, whereby, additional individual reflectors can be used, in order to form a modular system. In this way, the reflector size can be expanded and the reflector can be adapted in a simple way to specific requirements. In addition, costs are saves, since the individual reflector elements are preferably identical and the overall reflector is constructed according to a building-block principle.

Preferably, the individual reflectors are folded up like an umbrella and have an approximately cylindrical or truncated-conically shaped outer periphery in the folded state. In this way, the individual reflectors in the folded state can be stored with their longitudinal axes aligned essentially parallel to one another and/or parallel to a surface of the central element. In this way transport into orbit is made possible with a minimum space requirement.

The reflector can be mounted on a main support arm in such a way that it can be displaced on the main support arm in the folded state.

According to another aspect of the invention, a reflector or reflector element is produced for antennas for use in space, which has a heat-stable foldable surface structure, which serves as a reflector surface, the reflector element having a multiple number of ribs for supporting the surface structure and a rigid central structure, which is connected to the ribs by pivotal connections, so that the surface structure can be deployed by pivoting the ribs outwards.

Thus, the reflector element can be stowed in a very small space, and can easily be deployed. The ribs can be aligned essentially parallel to one another in the folded state and they are pivoted in the deployed state, preferably essentially radially outwards from the central structure.

The surface of the reflector is made from CFK. In this way, a high stability is obtained relative to thermal stresses and radiation pressure. The surface can be provided with an RF-effective layer, for example, a metalized Kapton foil. The surface structure is preferably subdivided into individual pre-shaped segments of part-parabolic or part-spherical shape, which can each be held by two ribs and they are arranged, circumferentially around the central part. Preferably, the ribs are connected to the surface structure by means of an elastic joint. This elastic joint can include an intermediate rib element and a slitted profile member to enable a good and easy adaptation to the curvature of the reflector.

The pivotal connections are preferably made of flexible, elastic elements, such as, coil springs or leaf-springs, which are preferably form-stable and have, in particular, a defined buckling direction. The reflector element can also have a detachable clamping device for holding the reflector element in its folded state. In this way, a deployment is possible without an actuator, due to a pre-stressing of the pivotal connections.

According to yet another aspect of the invention, a reflector is provided which comprises one or more reflector elements according to the invention as the individual reflectors as described above.

The process for deployment a reflector according to the invention comprises the steps of:

outwardly swinging a multiple number of folded individual reflectors joined to a central element, from a transport position into an operating position, deploying the individual reflectors in the operating position so that the individual reflectors adjoin one another to collectively form the overall reflector surface.

The individual reflectors can be moved in pairs into the deployed or operating position. Preferably, the reflectors are released under pre-stress after a securing mechanism is released.

DETAILED DESCRIPTION

Figure 1:
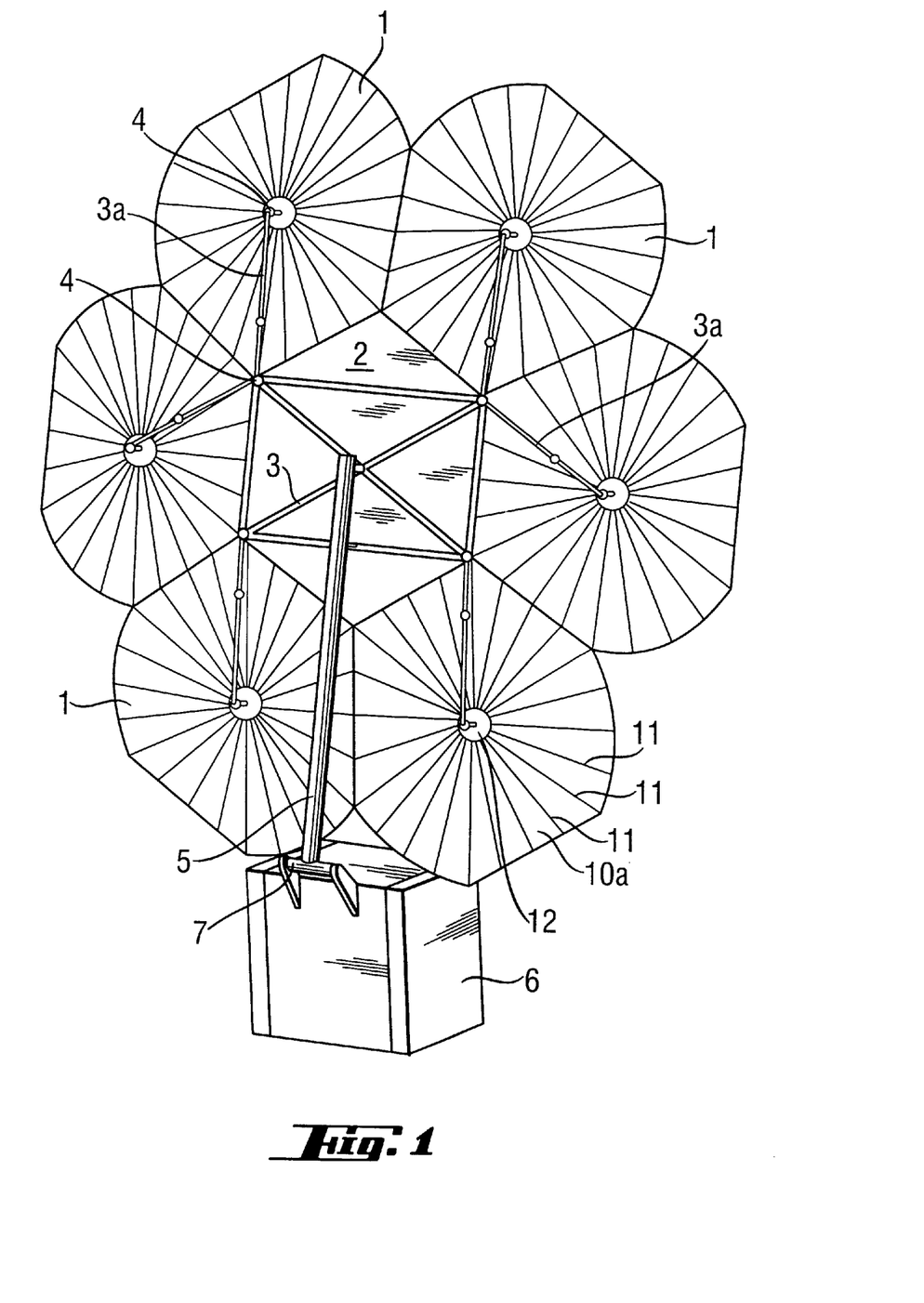
FIG. 1 shows a preferred embodiment of a reflector according to the invention in the deployed state.
Figure 2:
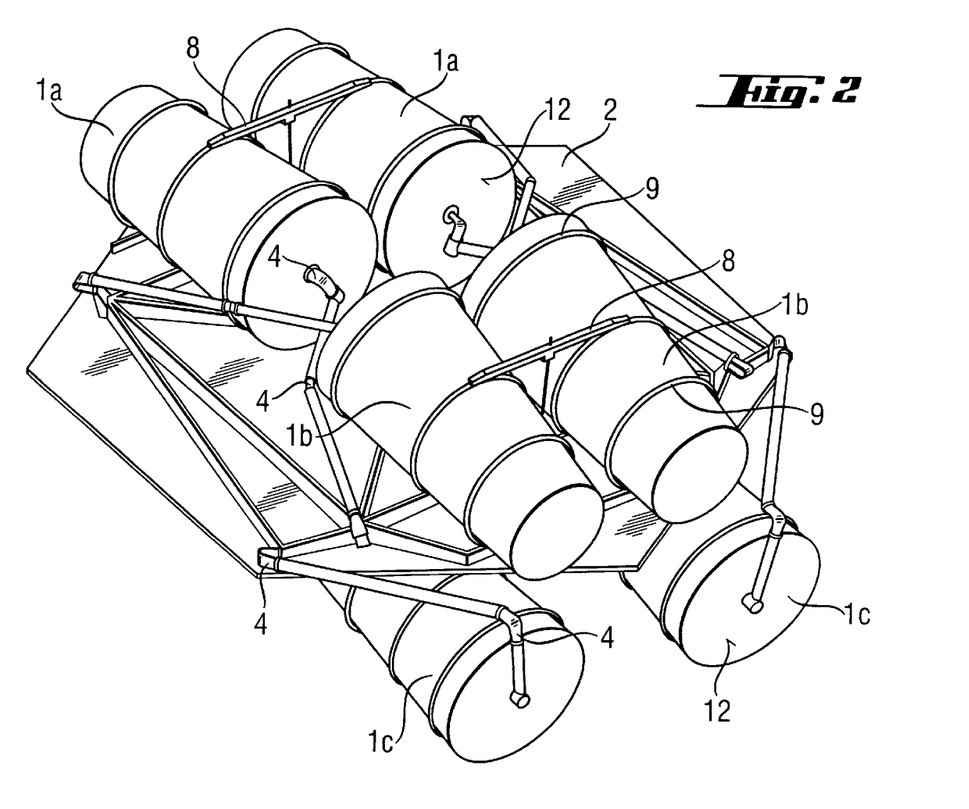
FIG. 2 shows the reflector according to the invention schematically in a stowed or compacted state.

FIG. 1 shows a preferred embodiment of the reflector of the invention in its deployed state. The reflector is constructed from a number of umbrella-type individual or partial reflectors 1 that can be deployed, which are circumferentially arranged around a rigid central reflector 2, which forms a central support element of the reflectors 1. The individual reflectors 1 and the central reflector 2 are connected together by a support structure 3, which is collapsible to provide a compact, folded state of the reflector (FIG. 2). In the open or deployed state shown in FIG. 1, the reflector is in its operating position.

The central reflector 2 and the partial reflectors 1 are connected together by support arms 3a, which form part of support structure 3. Support arms 3a of partial reflectors 1 are formed as rolled carbon-fiber tubes having a laminate structure designed to be heat-stable and resistant to bending. Hinge joints 4 are provided on arms 3a to achieve a horizontal pivotal capability of arms 3a relative to central element 2 as well as relative to partial reflectors 1 in order to bring each reflector from its folded state (FIG. 2) to its operating position shown in FIG. 1. The hinge joints are spring biassed in a direction to open the reflector to its unfolded state as will be explained later.

A main support arm 5 of the support structure 3 is connected to a mounting base 6 which can be the satellite itself or a separate housing by a hinge 7. Ribs 11 extend radially outward from a central member 12 of each reflector 1 and support the reflector at its back side. Each reflector 1 has a hexagonal outer contour as does the central support element 2. In the deployed position shown in FIG. 1, the reflectors 1 abut one another and the central support element 2 to collectively form the overall reflector surface. Accordingly, the central support element is, itself, formed as a reflector. Each individual reflector 1 is divided into twenty four individual sectors 10a arranged radially around the respective central part 12.

The reflector shown in FIG. 1, is constructed as a module from the individual reflectors 1 and has a diameter of approximately 3 meters in the preferred embodiment. Larger reflectors can also be produced, however, in a simple way due to the modular construction. Individual reflectors 1 are made of foldable, form-stable CFK (carbon-fiber-reinforced plastic) structures, with a porous CFK surface, such as, for example, Triax fiber or the like, which is supported on the ribs 11 of the respective reflectors 1 and is folded or deployed in the manner of an umbrella. When it is deployed, the small central part 12 of each reflector 1 remains fixed in position. The reflector surface is shaped with high precision, whereby a metallized Kapton foil can be provided as an RF-effective layer in a particular embodiment. The configuration of the reflector surface as a fiber network structure provides a reduction in the degree of radiation. Support arms 3a are foldable, structurally stable rods, which securely hold the reflectors 1 in their final position.

FIG. 2 shows the reflector according to the invention in the folded state, suitable for transport into orbit. Two pairs of individual reflectors 1a, 1b are folded together and are fixed and positioned in respective pairs by a securing mechanism 8. The pairs of reflectors 1a and 1b are arranged at the back side of central reflector 2. The respective securing mechanisms 8 enclose two individual reflectors and hold them under pre-stress against the back side of central reflector 2. In this position, the longitudinal axes of the folded individual reflectors 1a, 1b, are aligned parallel to the back side of central reflector 2.

Each individual reflector 1 is secured in its umbrella-like folded state by a closure device 9, which is comprised of two retainer straps. Two folded individual reflectors 1c are arranged at the front side of central reflector 2 in this embodiment. Hinge joints 4 enable the individual reflectors 1a, 1b, 1c to be brought from the folded position shown in FIG. 2 to the operating position shown in FIG. 1 under the bias of the hinge joints 4.

In a preferred embodiment, the hinge joints 4 are formed as elastic, form-stable leaf-spring elements. They are free of play and they make possible a horizontal pivotal movement around respective horizontal axes. The elements of joints 4 are concave in cross-section and are produced from CFK. In the position shown in FIG. 2, joints 4 are pre-stressed, whereby the individual reflectors 1 are brought automatically into the operating position by releasing the securing mechanism 8. The hinge joints 4 can also be formed by conventional springs which are compressed when the reflectors are collapsed to provide a bias to urge the reflectors out to their operative positions.

FIGS. 3a to 3f shown the deployment of the reflectors 1 in different stages.

Figure 3A:
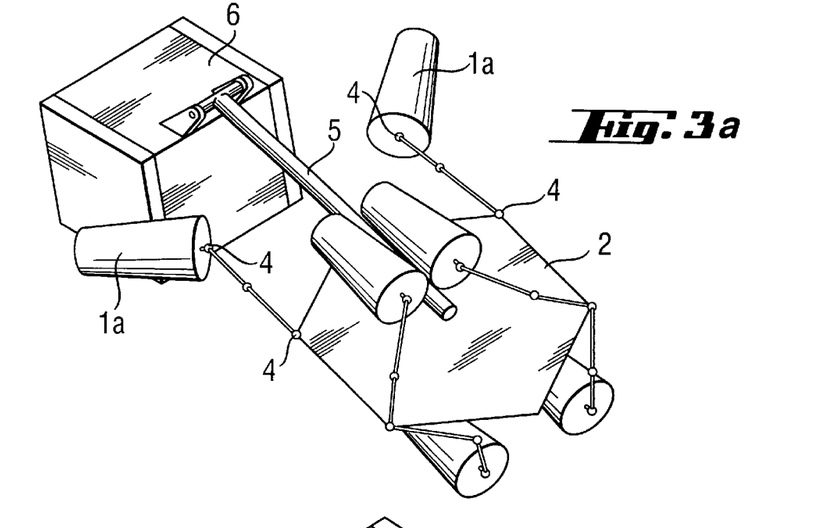
FIGS. 3a to f show various phases of a deployment operation of the reflector.

FIG. 3a shows the stage in which after pivoting arm 5 from a position adjacent to base 6 to the position shown in FIG. 3a, the securing mechanism 8 of the first pair of individual reflectors 1a (securing mechanism 8 is not shown in FIG. 3a), is released and the individual reflectors 1a swing out to their respective operating position. The expulsion of the reflectors 1a is produced by the pre-stress of the hinge joints 4, which cause a self-actuated positioning of the two individual reflectors 1a, which are still folded, due to their defined pre-stress and defined hinge axis.

Figures 3B, 3C:
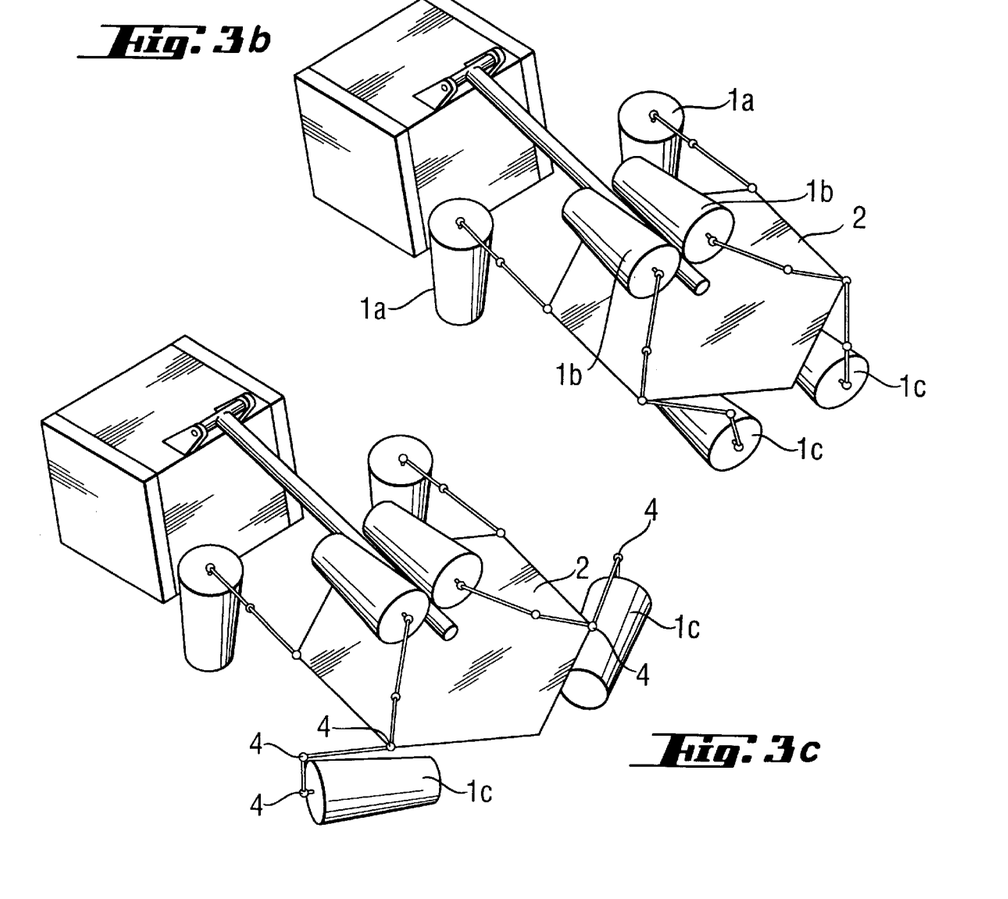

The two individual reflectors 1a are shown in FIG. 3b in the obtained operating position. The longitudinal axes of the individual reflectors 1a are aligned perpendicular to the surface of central reflector 2 in this position.

In the next stage of deployment shown in FIG. 3c, the pair of individual reflectors 1c arranged at the front side of central reflector 2 are moved to their final position when the associated securing mechanism 8, is released. The expulsion and the positioning are again produced by the spring action of the hinge joints 4.

Figure 3D:
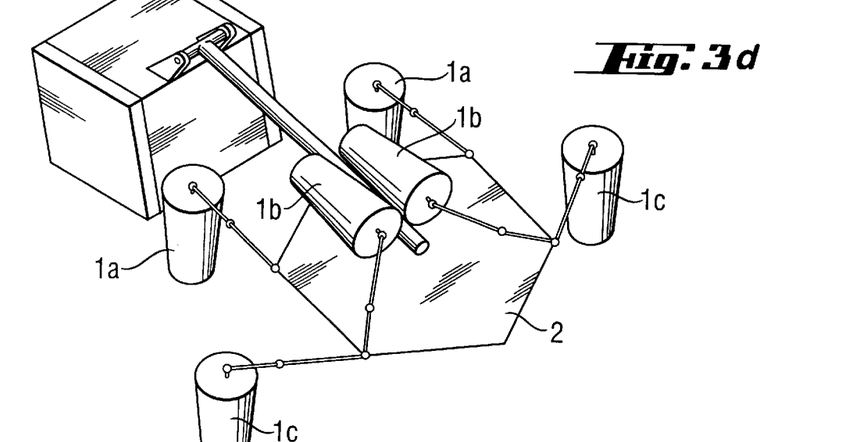
Figures 3E, 3F:
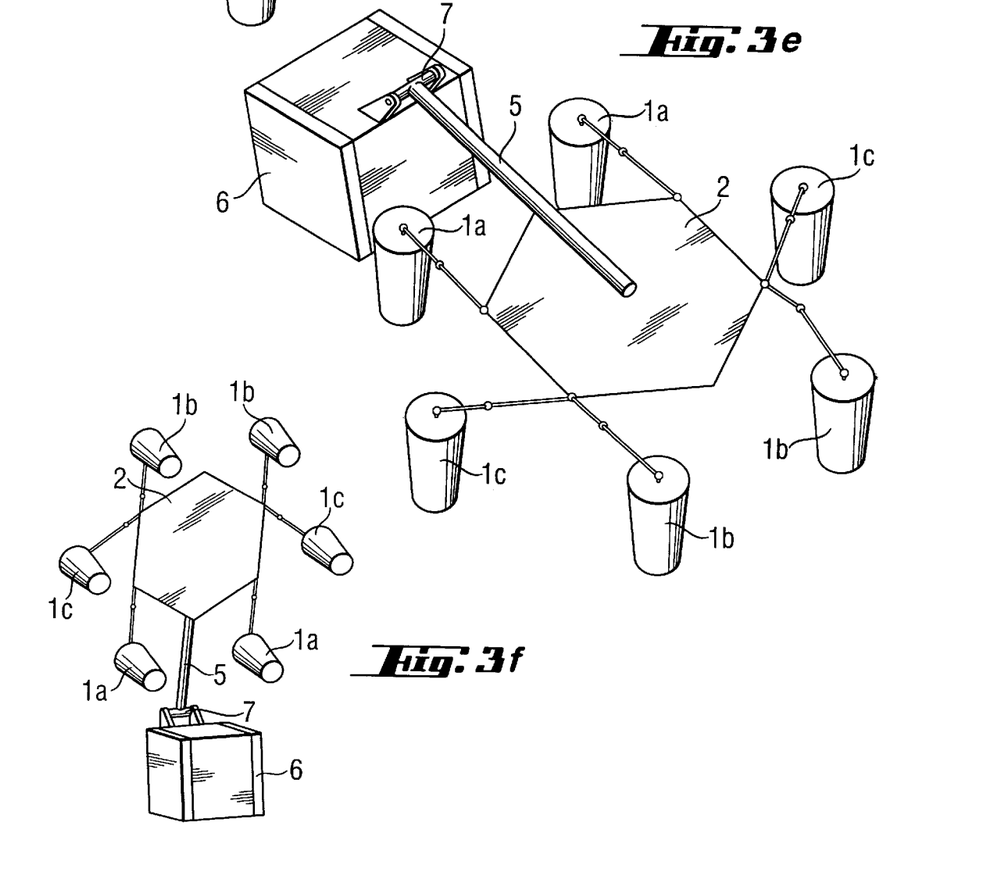

The two pairs of individual reflectors 1a, 1c are shown in their obtained final position in FIG. 3d. Next the securing mechanism 8 of the two individual reflectors 1b at the back side of central reflector 2 is released, whereby these two individual reflectors are brought to their final position relative to central reflector 2 (FIG. 3e). Then the connection arm 5 is pivoted around hinge 7 on base 6 to move central reflector 2 together with the individual reflectors 1a, 1b, 1c, to an upstanding position as shown in FIG. 3f.

The sequential deployment of the reflector is thus carried out in the following steps:

1. outwardly pivoting the reflector system away from casing 6,
2. swinging out individual reflectors 1 of respective pairs,
3. pivoting of connection arm 5 to its final position, and
4. opening the individual reflectors 1 to their final deployed positions.

Shock forces due to the unfolding and deployment are minimized, since only small individual masses are moved to their final position. The steps can also be conducted in a different sequence.

Figure 4:
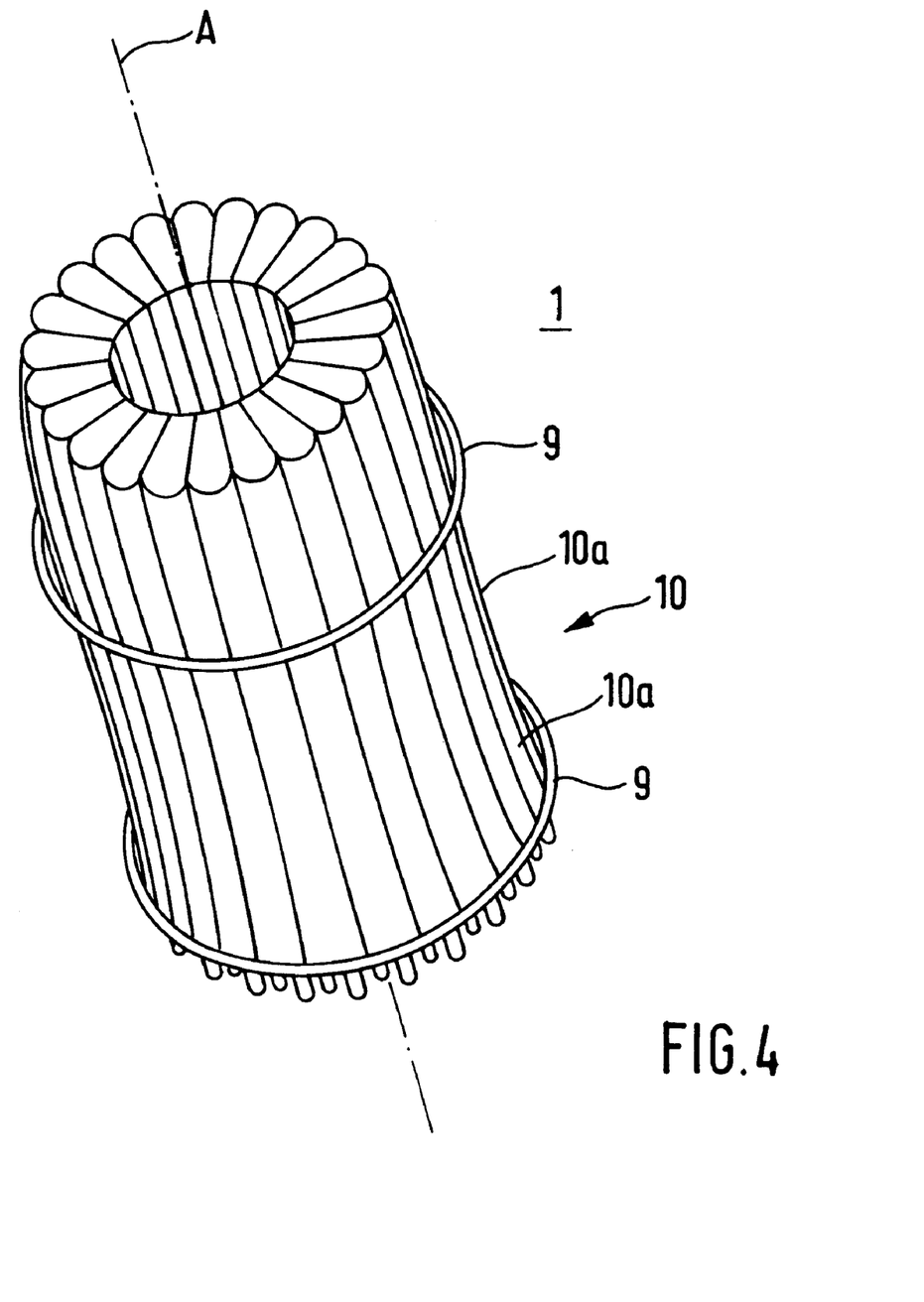
FIG. 4 shows a reflector element according to the invention in the folded state.

In FIG. 4, an individual reflector 1 is shown in its folded state. A clamping device 9, formed as a tightenable strap, encloses the periphery of the folded individual reflector 1 at its lower end and at its upper third. The outer periphery of the individual reflector 1 is shaped essentially cylindrically or as a truncated cone in the folded state. Reflector 1 has a surface structure 10, which is subdivided into individual segments 10a, which extend in the longitudinal direction around a longitudinal axis, i.e., the segments are folded parallel to the longitudinal axis A of the reflector.

Figure 5:
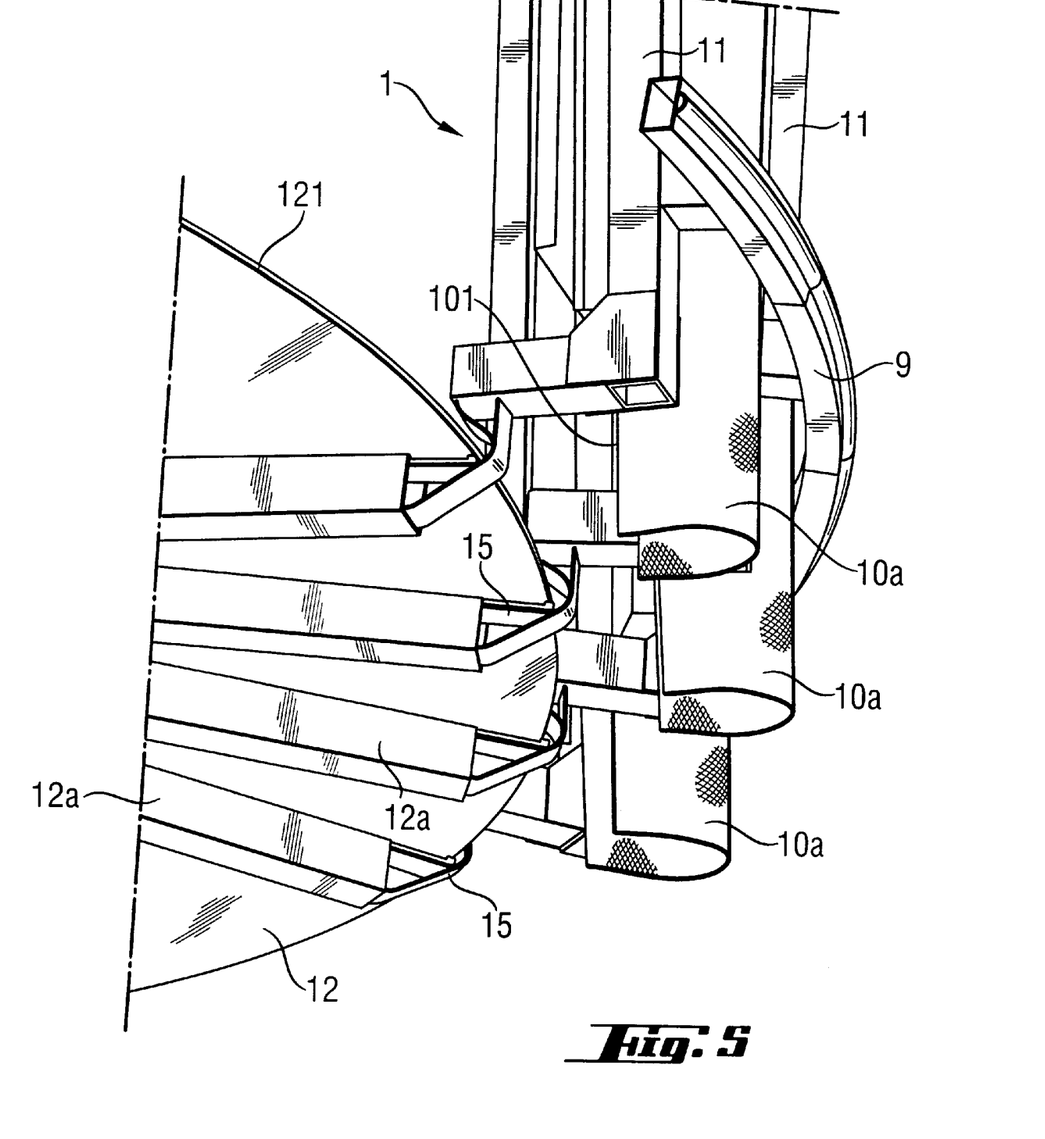
FIG. 5 shows a portion of the back side of the folded reflector element.

A portion of a folded individual reflector 1 is shown in FIG. 5 in a view from the bottom. Each of the folded segments 10a is held rigidly between two ribs 11, which are attached to the edges 101 of respective segments 10a. Ribs 11 are aligned in the folded state essentially parallel to one another and extend outwards from edge 121 of the round, rigid central part 12. Ribs 11 are connected to central part 12 by hinge joints 15. Each joint 15 is comprised of CFK push-pull belt or leaf-spring elements, which have a curvature in their cross-section or are concavely shaped in order to resist transverse forces. A play-free operation of joints 15 is made possible by the configuration of joints 15 as elements of elastic material or elastic, concave spring joints.

Figure 6:
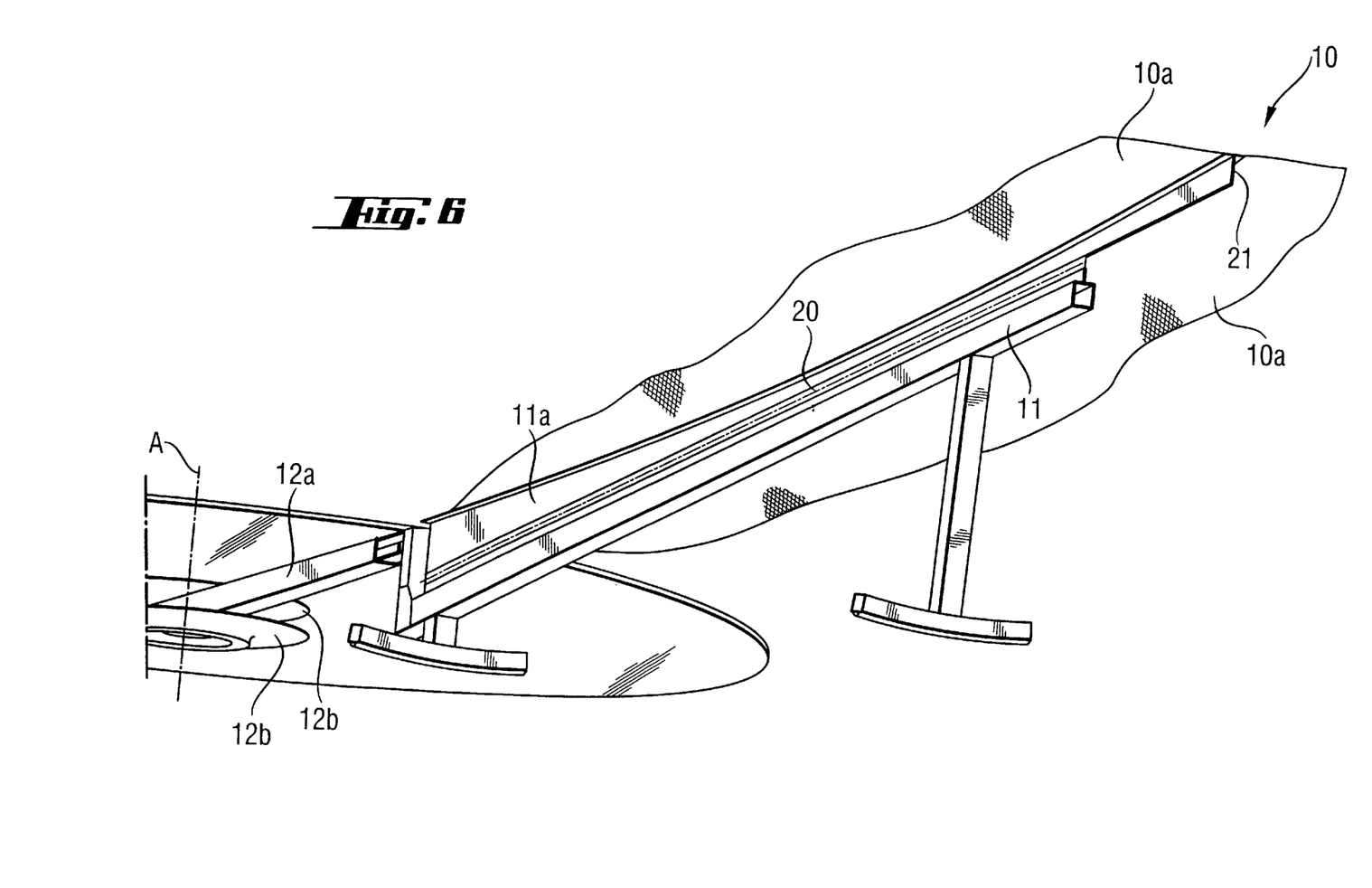
FIG. 6 shows a portion of the back side of the deployed reflector element.

FIG. 6 shows a portion of the back side of the individual reflector 1 in the deployed state. Ribs 11 form reflector arms, which support the foldable surface structure 10, which is constructed as a heat-resistant, form-stable structure, for example, having carbon filaments or fibers at its surface.

The self-supporting, parabolic or spherically shaped surface segments 10a are respectively supported by two ribs 11, which are connected to the structure of the segments by means of a foil joint 20 and a slitted L-profile member 21 adapted to the reflector contour. Namely, the rib 11 is secured to the reflector structure by means of an intermediate structure 11a, which is adapted to follow the curved contour of the reflector segment when it is deployed. The intermediate structure 11a is comprised of two CFK plates, which are glued at one side to foil 20 and on the other side are connected to the slitted L-profile 21 of CFK, which forms the connection to the reflector structure. By slitting one leg of L-profile member 21, a simple adaptation to the curvature of the reflector is possible.

Central part 12 comprises star-shaped CFK hollow profiles 12a, which are adhered together in the center on the upper and lower sides by means of CFK disks 12b. One of the CFK disks 12b forms the intersection to the connecting flexible joint 4 of the connecting arm 3a of the reflector, which is not shown in FIG. 6.

Figure 7A:
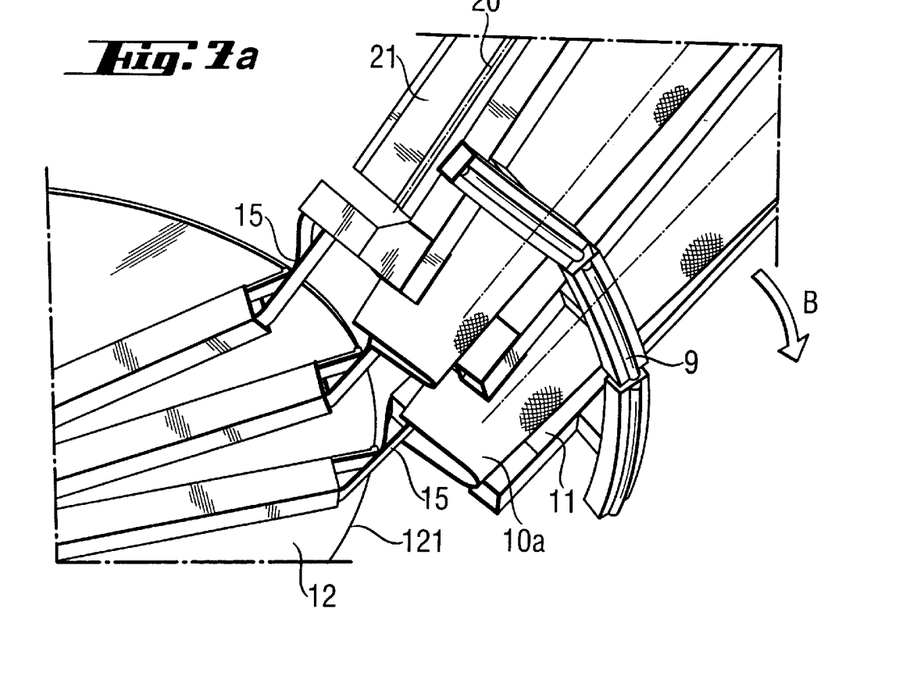
FIGS. 7a and 7b show different phases of the deployment of the reflector element.
Figure 7B:
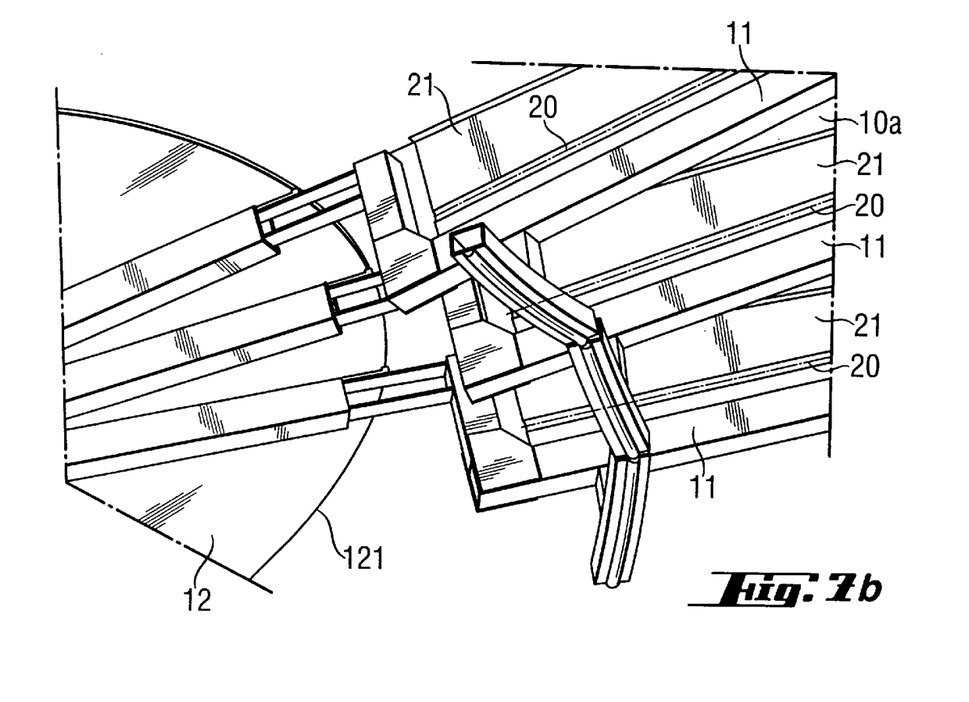

The deployment of the individual reflectors 1 is shown schematically in FIGS. 7a and 7b. Joints 15 which are pre-stressed in the folded state cause ribs 11 to open up radially outwardly around edge 121 of central part 12, as shown by arrow B, when clamping devices 9 are released. The deployed final position is shown in FIG. 7b.

By the distribution of joints 15 along a curved line formed by edge 121 of central piece 12, the radial extension of ribs 11 in the deployed state is made possible. The distance between two adjacent ribs 11 is increased when the parallel alignment of ribs 11 in the folded state changes to the radial alignment in the deployed state. In this way, segments 10a are deployed and obtain their final contour.

Joints 4 and 15 are FLEX-BOOM-elements, i.e., structures, which are changed due to the elastic change of their cross-sectional geometry from a bearing structure that is easy to bend to one that is resistant to bending. Joining and locking functions are integrally united thereby.

The reflector according to the invention combines the advantages of a small mass of a large reflector surface with a high surface accuracy and stability. It is heat-stable, cost-favorable, and suitable for larger numbers of pieces due to the modular system and can be applied in various ways. The reflector is suitable not only for antennas, but is can also be used, for example, as energy collecting mirrors in outer space.

Although the invention is disclosed with reference to particular embodiments thereof, it will become apparent to those skilled in the art that numerous modifications and variations can be made which will fall within the scope and spirit of the invention as defined by the attached claims.

What is claimed:

1. A reflector for use in outer space as an antenna, comprising:
   a plurality of individual reflector-elements, each of said reflector elements comprising a member having a surface serving as a reflector surface and a plurality of ribs connected to said member,
   a rigid central element,
   a support structure connecting said individual reflector elements to said central element, said support structure having collapsed and extended states which provide respective collapsed and deployed states for said reflector elements,
   said reflector elements in said deployed state adjoining one another to collectively form said reflector, said central element comprising a central reflector element which forms part of said reflector when the reflector elements are deployed.

2. The reflector as claimed in claim 1, wherein said central element and said reflector elements respectively have a hexagonal peripheral outline, adjacent reflector elements abutting one another and said central element when deployed.

3. The reflector as claimed in claim 1, wherein said support structure includes rigid support arms and elastic connections on said arms connecting said reflector elements to said arms to provide pivotal movement therebetween.

4. The reflector as claimed in claim 1, wherein each reflector element is opened from a closed state to an open state in umbrella-like manner when the reflector element is in deployed state, each reflector in the closed state being substantially of cylindrical or truncated conical shape.

5. The reflector as claimed in claim 1, wherein said reflector elements have longitudinal axes which in the collapsed state are substantially parallel to one another and to said central element.

6. The reflector as claimed in claim 1, wherein said support structure includes a support arm having means for attachment to an external casing.

7. The reflector as claimed in claim 1, wherein said central element and said reflector elements have the same polygonal peripheral outline and when deployed said reflector elements extend symmetrically around said central element with respective edges in abutment with said central element and with adjacent reflector elements.

8. The reflector as claimed in claim 1, comprising a releasable securing device to hold said reflector elements adjacent to said central element in said collapsed state of the reflector elements.

9. The reflector as claimed in claim 8, wherein said releasable securing device comprises a clamp member.

10. A reflector element for an antenna for use in outer space comprising:

a structure having a surface serving as a reflector surface, said structure having folded and unfolded states, said surface being deployed in said unfolded state to serve as said reflector surface.

a plurality of ribs connected to said structure, a rigid, central member, said structure including a plurality of shaped segments which are respectively connected together by said ribs which attach said segments to said central member in a radial arrangement therearound, and a plurality of separate elastic joints connecting said ribs to said segments, and pivotal connections between said central member and said ribs to enable said structure to be unfolded by pivotal movement of said ribs, wherein said ribs are substantially parallel to one another in the folded state and are substantially radial from said central member in the unfolded state.

11. The reflector element as claimed in claim 10, wherein said structure comprises a carbon fiber reinforced plastic material.

12. The reflector element as claimed in claim 10, comprising an RF-layer on said reflector surface.

13. The reflector element as claimed in claim 10, comprising a releasable clamping device for holding said structure in said folded state.

14. A reflector element for an antenna for use in outer space comprising:

a structure having a surface serving as a reflector surface, said structure having folded and unfolded states, said surface being deployed in said unfolded state to serve as said reflector surface, a plurality of ribs connected to said structure, a rigid, central member, and plurality of separate elastic joints connecting said ribs to said central member, where each of said elastic joints includes an intermediate rib element and an L-shaped slit element, pivotal connections between said structure and said ribs to enable said structure to be unfolded by pivotal movement of said ribs, wherein said pivotal connections include flexible element having a defined direction of buckling.

15. The reflector element as claimed in claim 14, wherein said structural member is formed as a leaf spring.

16. A process for providing a reflector with folded and deployed states, comprising:

providing a reflector structure having a plurality of individual reflector elements connected to a central support element, providing each of said reflector elements with a member serving as a reflector surface and a plurality of ribs connected to said member, pivotally moving the individual reflector elements from a collapsed state adjacent to the central support element to outwardly extending operating positions, keeping each reflector element in a folded condition in said collapsed state, unfolding said reflecting elements in said operating position so that the reflecting elements collectively form a reflector surface, and arranging said plurality of reflector elements in respective pairs on said central support element for collapse adjacent to one another in the respective pairs and for outward deployment to the extended position in said respective pairs, and providing said central support element with a central reflector element which forms part of said reflector when the reflector elements are deployed.

17. The process as claimed in claim 16, comprising automatically unfolding said reflecting elements to said operating positions by spring action.

18. The process as claimed in claim 16, comprising forming said reflector elements to extend symmetrically around said central support element with peripheral edges thereof in abutment with said central support element and with peripheral edges of adjacent reflector elements.

* * * * *